US012633300B2

(12) United States Patent
Cenzano Ferret

(10) Patent No.: US 12,633,300 B2
(45) Date of Patent: May 19, 2026

(54) PROCESSING OF AUDIO DATA USING A PLURALITY OF DISTRIBUTED COMPUTER DEVICES

(71) Applicant: Meta Platforms, Inc., Menlo Park, CA (US)

(72) Inventor: Jorge Cenzano Ferret, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 562 days.

(21) Appl. No.: 18/080,537

(22) Filed: Dec. 13, 2022

(65) Prior Publication Data

US 2023/0306977 A1 Sep. 28, 2023

Related U.S. Application Data

(60) Provisional application No. 63/322,905, filed on Mar. 23, 2022.

(51) Int. Cl.
*G10L 19/16* (2013.01)
*H04L 25/49* (2006.01)

(52) U.S. Cl.
CPC ............ *G10L 19/173* (2013.01); *H04L 25/49* (2013.01); *G10L 19/167* (2013.01)

(58) Field of Classification Search
CPC ............................ G10L 19/173; G10L 19/167
See application file for complete search history.

(56) References Cited

U.S. PATENT DOCUMENTS

| 8,494,866 B2 | 7/2013 | Stewart et al. |
| 9,324,332 B2 | 4/2016 | Doehla et al. |
| 10,218,826 B2 | 2/2019 | Eswaran et al. |

(Continued)

FOREIGN PATENT DOCUMENTS

| EP | 1299879 B1 * | 7/2006 | ............. G10L 19/02 |
| EP | 1855271 A1 * | 11/2007 | ........... G10L 19/173 |

OTHER PUBLICATIONS

Torii, et al. "Asymmetric Multi-Processing Mobile Application Processor MP211," NEC J. of Adv. Tech., 2005. (Viewable but no permission for download—see citation at Advisory Action) (Year: 2005).*

(Continued)

*Primary Examiner* — Feng-Tzer Tzeng
(74) *Attorney, Agent, or Firm* — EVERSHEDS SUTHERLAND (US) LLP

(57) ABSTRACT

According to examples, a system for using to processing of audio data using a plurality of distributed computer manner is described. The system may include a processor and a memory storing instructions. The processor may cause the system to receive audio data associated with a content item in an initial format, process the audio data to generate one or more audio segments for distributed processing, and decode the one or more audio segments from the audio data in the initial format to generate decoded audio data in a decoding format. The processor may then encode the decoded audio data in a decoding format to encoded audio data in an encoding format and trim a segment of the encoded audio data in the encoded format to generate a trimmed segment of audio data that may be utilized to enable continuous playback by a receiving device.

17 Claims, 7 Drawing Sheets

System
100

Memory
102

Receive audio data associated with a content item in an initial format
103

Decode audio data received in an initial format to generate decoded audio data in a decoding format
104

Processor
101

Encode audio data in a decoding format to generate encoded audio data in an encoding format
105

Trim a segment of encoded audio data in an encoding format to generate a trimmed segment of audio data
106

Concatenate a trimmed segment of audio data to a preceding audio segment for playback
107

(56)        References Cited

U.S. PATENT DOCUMENTS

| | | | |
|---|---|---|---|
| 2012/0046956 A1* | 2/2012 | Stewart | G10L 19/167 |
| | | | 704/500 |
| 2018/0069950 A1* | 3/2018 | Eswaran | H04N 21/2343 |
| 2021/0352342 A1 | 11/2021 | Thoma et al. | |

OTHER PUBLICATIONS

Rodrigues R., et al., "MPEG DASH-Some QoE-based Insights into the Tradeoff between Audio and Video for Live Music Concert Streaming Under Congested Network Conditions," Eighth International Conference on Quality of Multimedia Experience (QoMEX), Jun. 6, 2016, 7 pages.

* cited by examiner

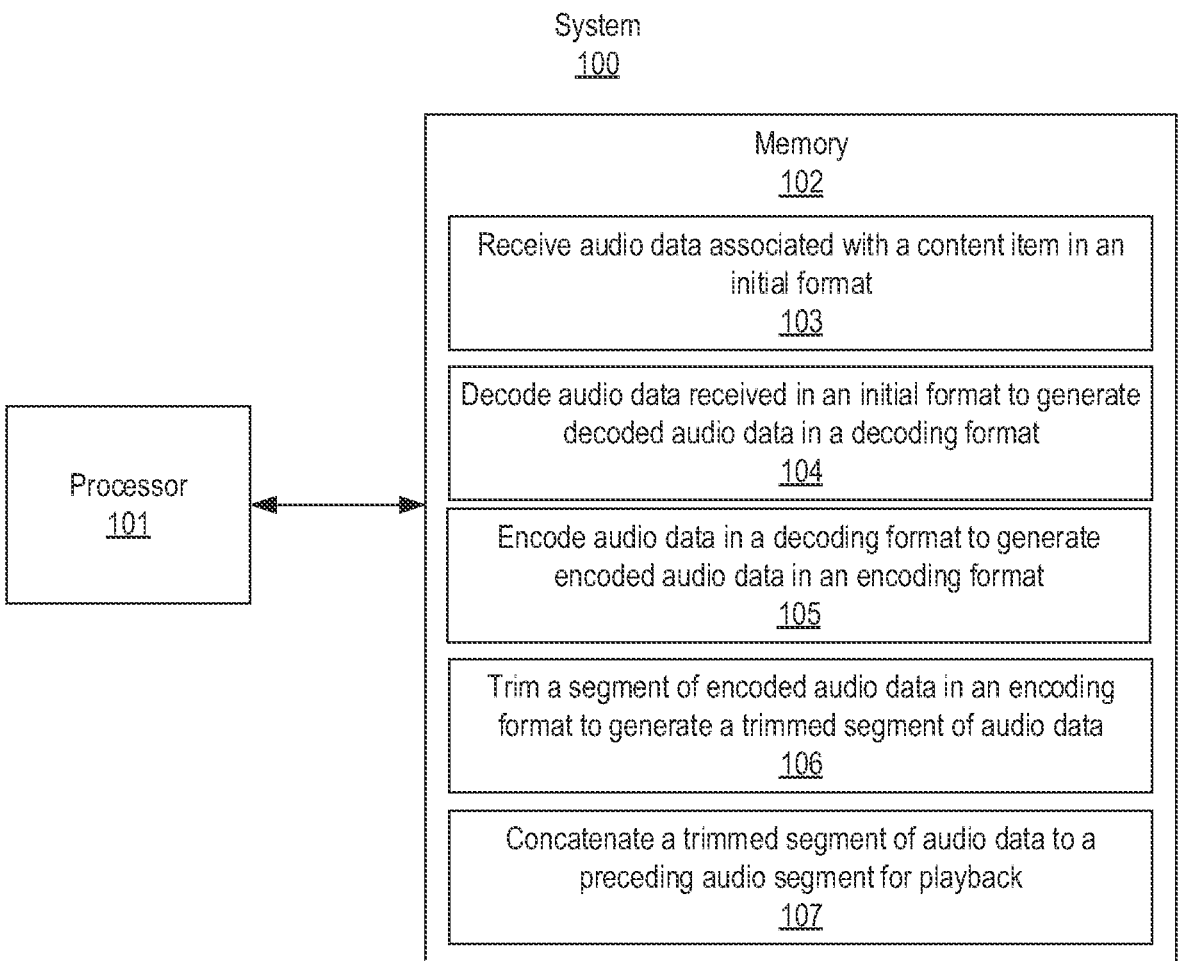

System
100

Memory
102

Receive audio data associated with a content item in an
initial format
103

Decode audio data received in an initial format to generate
decoded audio data in a decoding format
104

Encode audio data in a decoding format to generate
encoded audio data in an encoding format
105

Trim a segment of encoded audio data in an encoding
format to generate a trimmed segment of audio data
106

Concatenate a trimmed segment of audio data to a
preceding audio segment for playback
107

Processor
101

Receive data associated with a content item in an initial format
4010

Decode audio data received in an initial format to a decoding format
4020

Encode audio data in a decoding format to an encoding format
4030

Trim a segment of audio data to generate one or more audio segments for playback
4040

Concatenate a trimmed audio segment to a preceding audio segment
4050

PROCESSING OF AUDIO DATA USING A PLURALITY OF DISTRIBUTED COMPUTER DEVICES

PRIORITY

This patent application claims priority to U.S. Provisional Patent Application No. 63/322,905, entitled "Processing of Audio Data Using a Plurality of Distributed Computer Devices," filed on Mar. 23, 2022.

TECHNICAL FIELD

This patent application relates generally to generation and delivery of data, and more specifically, to systems and methods for processing of audio data using a plurality of distributed computer devices.

BACKGROUND

With recent advances in technology, prevalence and proliferation of content creation and delivery has increased greatly in recent years. Content creators are continuously looking for ways to deliver more appealing content.

One content type often favored by users may be "streaming" content. In some examples, a service provider may implement a computer system to provide continuous transmission (e.g., "stream-casting") of data to a user.

In some examples, instead of using one centralized computer system to generate one or more renditions of a content item, a plurality of distributed computer devices may be employed. However, in some instances, it may be difficult to determine one or more associations (e.g., references) between segments of audio data. Consequently, in some examples, distributed computer devices may be unable to process (e.g., transcode) segments of audio data in a coordinated manner.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIG. 2B illustrates a block diagram of the system to process audio data using a plurality of distributed computer devices, according to an example.

DETAILED DESCRIPTION

Figure 1A:
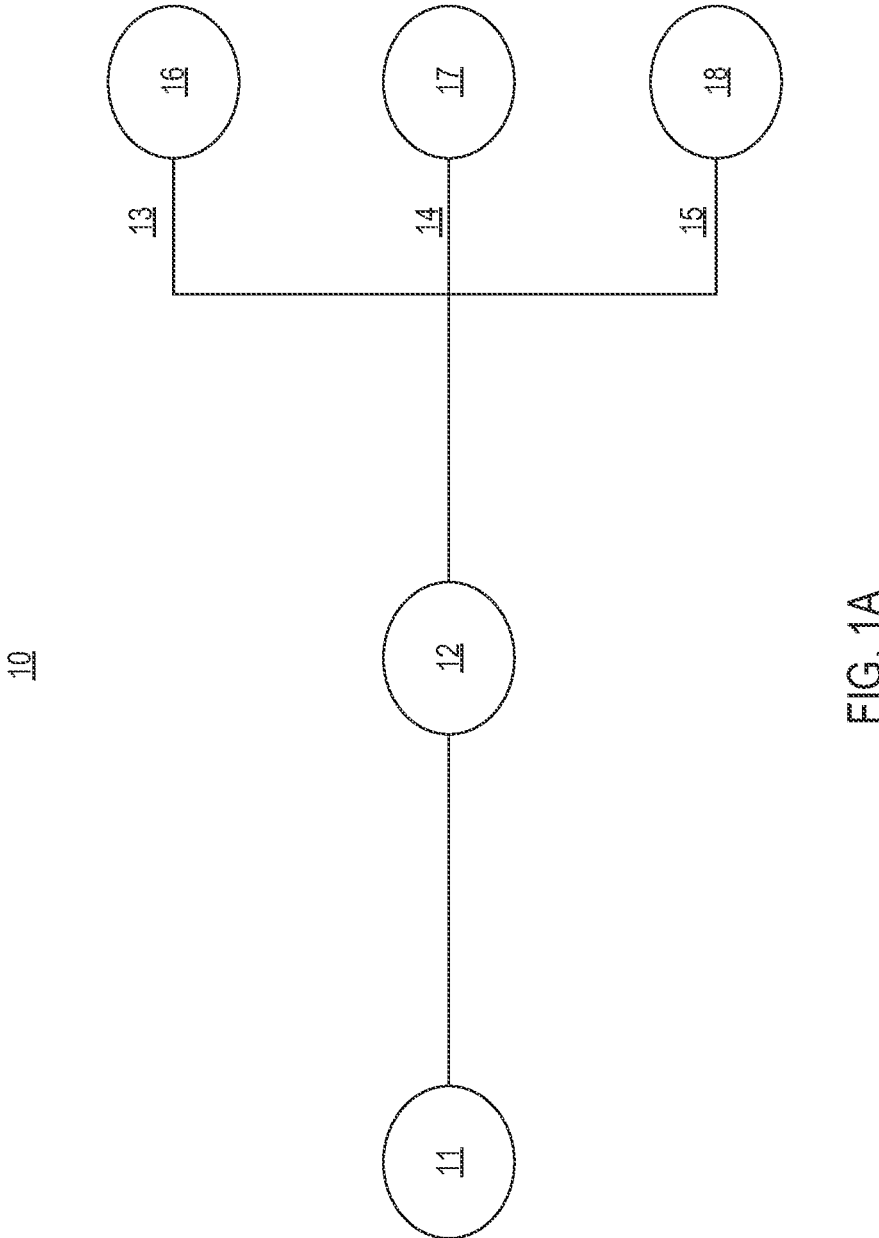
FIG. 1A illustrates a block diagram of a computer network for processing a content item according to a linear arrangement, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Typically, a content platform having one or more content items that may be provided by a service provider. As used herein, "digital content", "digital content item" and "content item" may refer to any digital data (e.g., a data file). Examples of digital content items include, but are not limited to, digital images, digital video files, digital audio files, and/or streaming content. Examples of types of content that may be shared over various content platforms may include audio (e.g., podcasts, music), video (e.g., music videos, variety shows, etc.), and text (e.g., micro-blogs, blogs, etc.).

In some examples, content items on a content platform may be shared by a first user with one or more other users of the content platform. As used herein, a "user" may include any user of a computing device or digital content delivery mechanism who receives or interacts with delivered content items, which may be visual, non-visual, or a combination thereof.

One content type often favored by users may be "live" content. As used herein, live content may include any content published in real-time. In some instances, users may prefer live content as it may offer an unfiltered and synchronous experience that may be authentic and compelling.

Live content published over content platforms may take numerous forms. In one example, live content may take the form of a live event (e.g., a concert, a sporting event, etc.). In another example, live content may take the form of a discussion with another party (e.g., a podcast, a live stream, an audio call, a video call, etc.). It may be appreciated that while some examples described herein may be directed to live content, the systems and methods described may be directed to any data that may be transmitted electronically, whether live or not.

In some examples, to facilitate publication and distribution of live content (e.g., a live sporting event), a service provider may enable continuous transmission (e.g., "streaming" or "stream-casting") of data over a content platform to a user. As used herein, "stream", "streaming" and "stream-casting" may be used interchangeably to refer to any continuous transmission of data to a device.

In some examples, to transmit a content item, a content provider may transmit data associated with video from the content item (e.g., "video data") and/or data associated with audio from the content item (e.g., "audio data"). In particular, in some examples, the video data and the audio data may each be published in a particular standard or format, which may be referred to as "publication standard(s)" or "publication format(s)."

In some instances, video data may be published according to Advanced Video Coding (AVC) format. In some instances, the Advanced Video Coding (AVC) format may also be referred to as the "H264" format. In some examples, the Advanced Video Coding (AVC) format may employ one or more one or more instantaneous decoding refresh (IDR) frames. In some examples, an instantaneous decoding refresh (IDR) frame may represent a point in a stream of video data free from any dependencies associated with previous video data. In particular, in some examples, an instantaneous decoding refresh (IDR) frame may specify that no frame after the instantaneous decoding refresh (IDR) frame may reference any frame before it. Accordingly, in some examples and as will be discussed in greater detail, an instantaneous decoding refresh (IDR) frame may be employed to process and assemble segments of video data in a coordinated manner.

In some instances, audio data may be published according to the Advanced Audio Coding (AAC) format. In some examples, Advanced Audio Coding (AAC) may refer to an audio coding format for implementation of lossy digital audio compression. In some examples, Advanced Audio Coding (AAC) may utilize one or more "frames" of audio data, wherein each frame may include a particular number (e.g., one thousand twenty-four (1024)) of samples of audio data.

In some examples, to implement the Advanced Audio Coding (AAC) format, a modified discrete cosine transform (MDCT) may be utilized. Also, in some examples, to implement the modified discrete cosine transform (MDCT), a "window function" utilizing a "window" of particular number (e.g., two thousand forty-eight (2048)) of samples may be utilized as well.

As discussed above, in some examples, a content provider may publish (e.g., stream) a content item from a remote device (e.g., a server located at an event site) according to a "publication format." To consume the published content item, a user may utilize a user device to accommodate the publication format.

However, in some instances, a user's device may be unable to accommodate a publication format(s). To overcome this issue and to accommodate devices configured for various specifications or formats, in some examples, a content provider may process (e.g., transcode) audio data and video data associated with a content item to generate one or more "renditions." As used herein, a "rendition" may include any version of a content item according to a particular format or specification. In particular, in some examples, to accommodate a first user that may be utilizing a first device that may accommodate a first, higher-quality format, the content provider may generate a first (higher-quality) rendition. Also, in some examples, to accommodate a second user that may be utilizing a second device that may accommodate a second, lower-quality format, the content provider may generate a second (lower-quality) rendition. In some examples, a content provider may provide a plurality of different renditions (e.g., six or seven renditions) of a content item. So, in some instances, a user may utilize a device capable of changing (e.g., switching) to a second rendition "mid-stream" if difficulties may arise with a first rendition (e.g., where a mobile device may be moving in between cell towers).

In some examples, to process a content item to generate one or more renditions, a content item may require transcoding. As used herein, "transcoding" may refer to any digital-to-digital (e.g., "direct") conversion from one encoding format to another. In some examples, to generate the one or more renditions, audio data and video data from a content item may be transcoded from a publication format to one or more (rendition) formats.

In some examples, transcoding of audio data may include "audio priming." In some examples, audio priming may include introduction of one or more samples that may be discarded (e.g., "discard-able samples") by a decoder. In some examples, encoding and decoding of audio data according to an audio data format (e.g., Advanced Audio Coding (AAC)) may require audio samples in addition to audio data associated with a "source" content item. Accordingly, in some examples, one or more discard-able samples may be added (e.g., during encoding) at a beginning of audio data (e.g., Advanced Audio Coding (AAC) data). In some examples, a number of discard-able samples may be one thousand and twenty-four (1024) samples. Also some examples, the discard-able samples may be silent audio.

In some examples, a centralized processing system may transcode a content item (e.g., received in a publication format) to generate one or more renditions. As used herein, a "centralized processing system" may include one or more computer devices configured to enable processing at a centralized location.

In some examples, to generate one or more renditions of a content item, the centralized processing system may process (e.g., transcode) video data and audio data associated with a content item in a "linear" (e.g., continuous) fashion. In some examples, to transcode a content item in a linear fashion, the centralized processing system may receive a first segment of audio data (or video data) from the content item, transcode the first segment to generate one of the one or more renditions, and follow the transcoding of the first segment with transcoding of a second, sequential segment of the audio data. In some examples, the centralized processing system may sequentially transmit the first segment and the second segment to one or more user devices for playback in a linear manner.

FIG. 1A illustrates a block diagram of a computer network for processing a content item according to a linear arrangement, according to an example. In some examples, the computer network 10 may include a publication device 11 and a centralized processing system 12. In some examples, the publication device 11 may be a computer system located on-site where an event (e.g., a sporting event) may be occurring. In some examples, the publication device 11 may be utilized to capture video and audio data associated with the event, and to transmit the video and audio data in a publication format to the centralized processing system 12.

In some examples, the centralized processing system 12 may transcode video and audio data associated with a content item "linearly" to generate the one or more renditions 13-15. In particular, in some examples, the centralized processing system 12 may continuously receive the video and audio data from the publication device 11, and may sequentially transcode segments of the video and audio data to generate the one or more renditions 13-15. In some examples, the centralized processing system 12 may transmit the one or more renditions 13-15 to the user devices 16-18 for consumption.

In some examples, instead of using one centralized processing system to generate one or more renditions of a content item, a plurality (or "cluster" or "farm") of distributed, networked computer devices may be employed. That is, in some examples, the distributed cluster of networked computer devices may process data associated with a content item in a cooperative and/or coordinated fashion to generate the one or more renditions. In some examples, the distributed cluster of networked computer devices may provide flexibility and increase reliability.

In some examples, to generate one or more renditions, the distributed cluster of networked computer devices may each process one or more segments (or "chunks") of audio and/or video data associated with the content item. In some examples, the distributed cluster of networked computer devices may process the data associated with the content item in a coordinated manner to enable processed segments to be assembled to generate the one or more renditions of the content item. Moreover, in some examples, the one or more segments may be created according to increments of time (e.g., every ten (10) seconds), while in other examples, the one or more segments may be created according to increments of data.

Figure 1B:
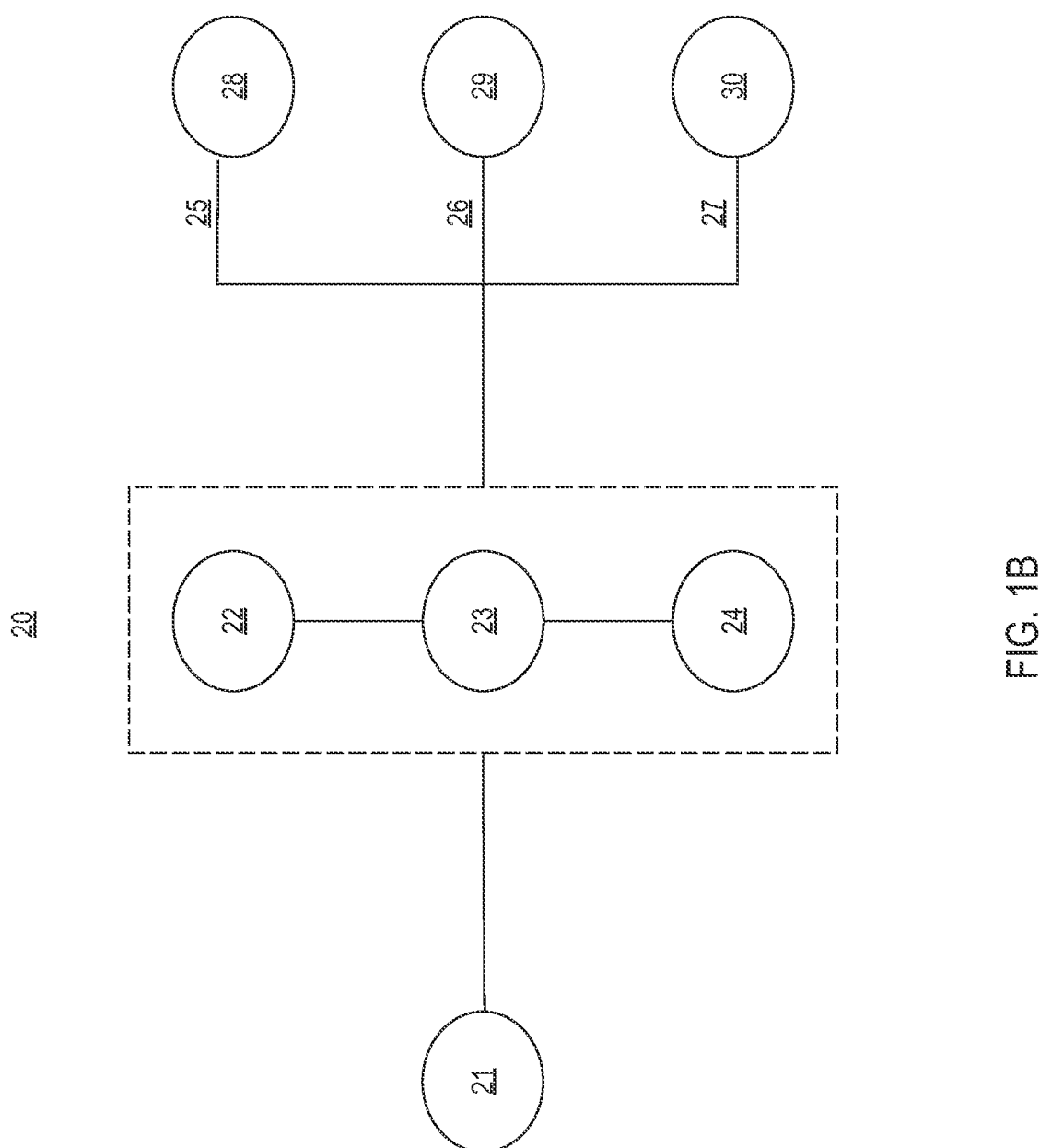
FIG. 1B illustrates a block diagram of a computer network for transcoding a content item according to a distributed arrangement, according to an example.

FIG. 1B illustrates a block diagram of a computer network for transcoding a content item according to a distributed arrangement, according to an example. In some examples, the computer network 20 may include a publication device 21 and a distributed cluster of networked computer devices 22-24. In some examples, the publication device 21 may be a computer system located on-site where an event (e.g., a sporting event) may be occurring. In some examples, the publication device 21 may capture video and audio data associated with the event, and to transmit the video and audio data in a publication format to the distributed cluster of networked computer devices 22-24. In some examples, the distributed cluster of networked computer devices 22-24 may transmit the one or more renditions 25-27 to the user devices 28-30 for consumption.

In some examples, the distributed cluster of networked computer devices 22-24 may transcode one or more segments video and audio data associated with a content item in coordinated manner to generate the one or more renditions 25-27. So, in some examples, the computer device 22 may transcode a first segment of audio data and the computer device 24 may transcode a second (following) segment of the audio data to generate a first rendition 25. In some examples, the computer device 22 and the computer device 24 may transmit the first segment of the audio and the second (following) segment of the audio data associated with the first rendition to the user device 28 in a coordinated manner to enable continuous playback.

It may be appreciated that in order to generate each rendition of one or more renditions of a content item, a distributed cluster of computer devices may be required to process and transmit data segments in a coordinated manner to enable continuous playback by a receiving device. In particular, in some examples, to process and transmit video data utilizing a distributed cluster of networked computer devices, it may be necessary to determine one or more associations (e.g., references) between segments of video data. More specifically, in some examples, for a particular segment of video data, it may be necessary to determine a preceding segment and a following segment. Upon determining the preceding segment and the following segment, the particular segment may be transcoded and played back in a sequential manner.

In some examples, to process segments of video data in a coordinated manner and to transmit the segments of video data in manner that may enable sequential playback, an instantaneous decoding refresh (IDR) frame may be employed. In some examples, to parse an original (linear) video stream into chunks that enables distributed (and even parallel) processing, it may be necessary to do so without utilizing dependencies between previous and following chunks (e.g., the chunks should be "self-contained"). To achieve this, in some examples, instantaneous decoding refresh (IDR) frames may be utilized. Accordingly, in some examples, use of the instantaneous decoding refresh (IDR) frame may enable the distributed cluster of networked computer devices to operate in an "orchestrated" manner.

However, it may be appreciated that in processing of audio data may present different issues, since various audio formats (e.g., Advanced Audio Coding (AAC)) may not employ reference elements (e.g., similar to an instantaneous decoding refresh (IDR) frame). As a result, in some examples, it may be difficult to determine one or more associations (e.g., references) between segments of audio data. Moreover, in some examples, a distributed cluster of networked computer devices may be unable to process (e.g., transcode) segments of audio data in a coordinated manner, and therefore may be unable to transmit the (processed) segments of audio data in manner that may enable sequential playback.

In some examples, additional issues with processing of audio data may arise as well. In particular, in some examples, a requirement of priming (discussed above) may present issues in processing and transmitting of audio data utilizing a distributed cluster of networked computer devices as well. In particular, in utilizing certain audio formats (e.g., Advanced Audio Coding (AAC)), it may be necessary to associate a plurality of discard-able samples with each audio segment to be processed by the distributed cluster of networked computer devices. As a result, in implementing the distributed cluster of networked computer devices, each instance of discard-able samples associated with (respective) audio segments from a content item may be required to be associated prior to or during processing (e.g., transcoding).

In some examples, the systems and methods described herein may enable distributed processing of audio data utilizing a plurality of distributed and/or networked computer devices. In some examples, the systems and methods may enable the distributed processing by using, for each segment of audio data, a preceding data element (or a "prefix data element") and a following data element (or a "suffix data element"). In some examples, the systems and methods may enable a distributed cluster of networked computer devices to utilize the preceding data element and the following data element to process (e.g., transcode), assemble, and/or transmit one or more segments of audio data according to a continuous representation of an associated content item.

In some examples, the systems and methods may implement transcoding of audio data in a distributed manner (e.g., in parallel) by distributing different audio segments to different computer devices (or "instances") in a distributed cluster of networked computer devices. In some examples, the systems and methods may utilize a preceding data element and a following data element to associate one or more transcoded audio segments. Furthermore, in some examples, the preceding data element and the following data element may be utilized by the distributed cluster of networked computer devices to transmit the transcoded audio segments for continuous and sequential playback at a user device.

It may be appreciated that the systems and methods described herein may enable a distributed cluster of networked computer devices to generate one or more renditions of a content item. In particular, in some examples, the distributed cluster of networked computer devices may coordinate to generate a first rendition of audio content associated with a content item and a first rendition of video content associated with the content item, and may transmit the first rendition of audio content and the first rendition of video content in a coordinated manner (e.g., as the first rendition) for continuous and/or synchronous playback at a user device. Similarly, the distributed cluster of networked computer devices may coordinate to generate and transmit a second rendition and a third rendition to various user devices as well.

In some examples, the systems and methods may enable processing and transmitting of audio content via use of a distributed cluster of networked computer devices in "real-time." In particular, in some examples, the systems and methods may receive a content item in a publication format, and may process the received audio content with minimal latency to generate one or more renditions of the content item for transmission to user devices for consumption.

In some examples, the systems and methods described may include a system for implementing audio transcoding in a distributed fashion, comprising a processor and a memory storing instructions, which when executed by the processor, cause the processor to receive audio data associated with a content item in an initial format, decode the audio data associated with the content item in the initial format to generate decoded audio data in a decoding format, encode the decoded audio data in a decoding format to encoded audio data in an encoding format, and trim a segment of the encoded audio data in the encoding format to generate a trimmed segment of audio data. In some examples, the instructions when executed by the processor may further cause the processor to concatenate the trimmed segment of audio data with a preceding audio segment and transmit the preceding audio segment and the trimmed segment of audio data to a user device for playback. In some examples, the initial format is a publication format utilized by a remote device, and the publication format is Advanced Audio Coding (AAC). In some examples, to receive the audio data associated with the content item in an initial format, the instructions when executed by the processor further cause the processor to determine a length of an audio segment for processing. In some examples, the decoding format is pulse-code modulation (PCM). Also, in some examples, the decoded audio data in a decoding format includes an audio segment for playback, a preceding data element, and a following data element. In some examples, the audio segment for playback includes five (5) frames of audio data.

In some examples, the systems and methods describe may include a method for processing of audio data using a plurality of distributed computer devices, comprising receiving audio data associated with a content item in an initial format, decoding the audio data associated with the content item in the initial format to generate decoded audio data in a decoding format, encoding the decoded audio data in a decoding format to encoded audio data in an encoding format, trimming a segment of the encoded audio data in the encoding format to generate a trimmed segment of audio data, concatenating the trimmed segment of audio data with a preceding audio segment, and transmitting the preceding audio segment and the trimmed segment of audio data to a user device for playback.

In some examples, the systems and methods may include a non-transitory computer-readable storage medium for implementing audio transcoding in a distributed fashion and having an executable stored thereon, wherein the executable when executed instructs a processor to receive audio data associated with a content item in an initial format, decode the audio data associated with the content item in the initial format to generate decoded audio data in a decoding format, encode the decoded audio data in a decoding format to encoded audio data in an encoding format, and trim a segment of the encoded audio data in the encoding format to generate a trimmed segment of audio data. In some examples, the encoded audio data in the encoding format further includes a priming data element.

Figure 2A:
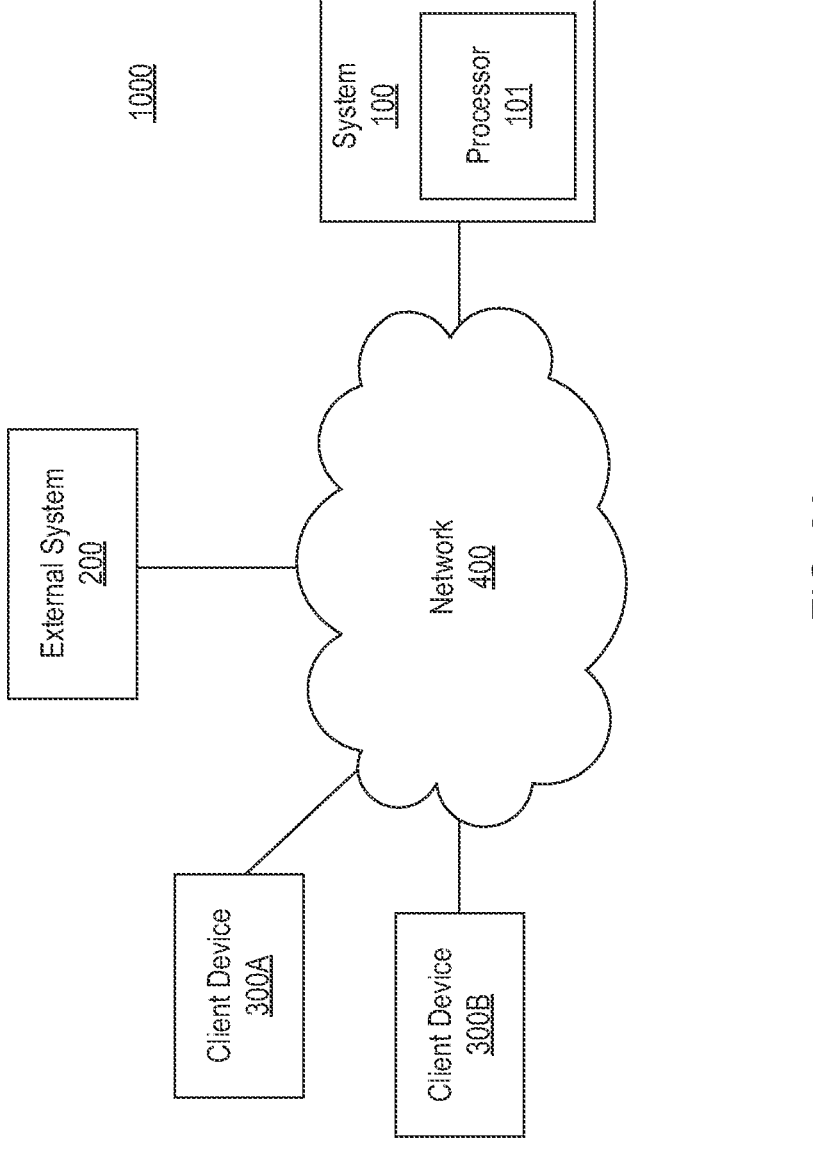
FIG. 2A illustrates a block diagram of a system environment, including a system, to process audio data using a plurality of distributed computer devices, according to an example.
Figure 2C:
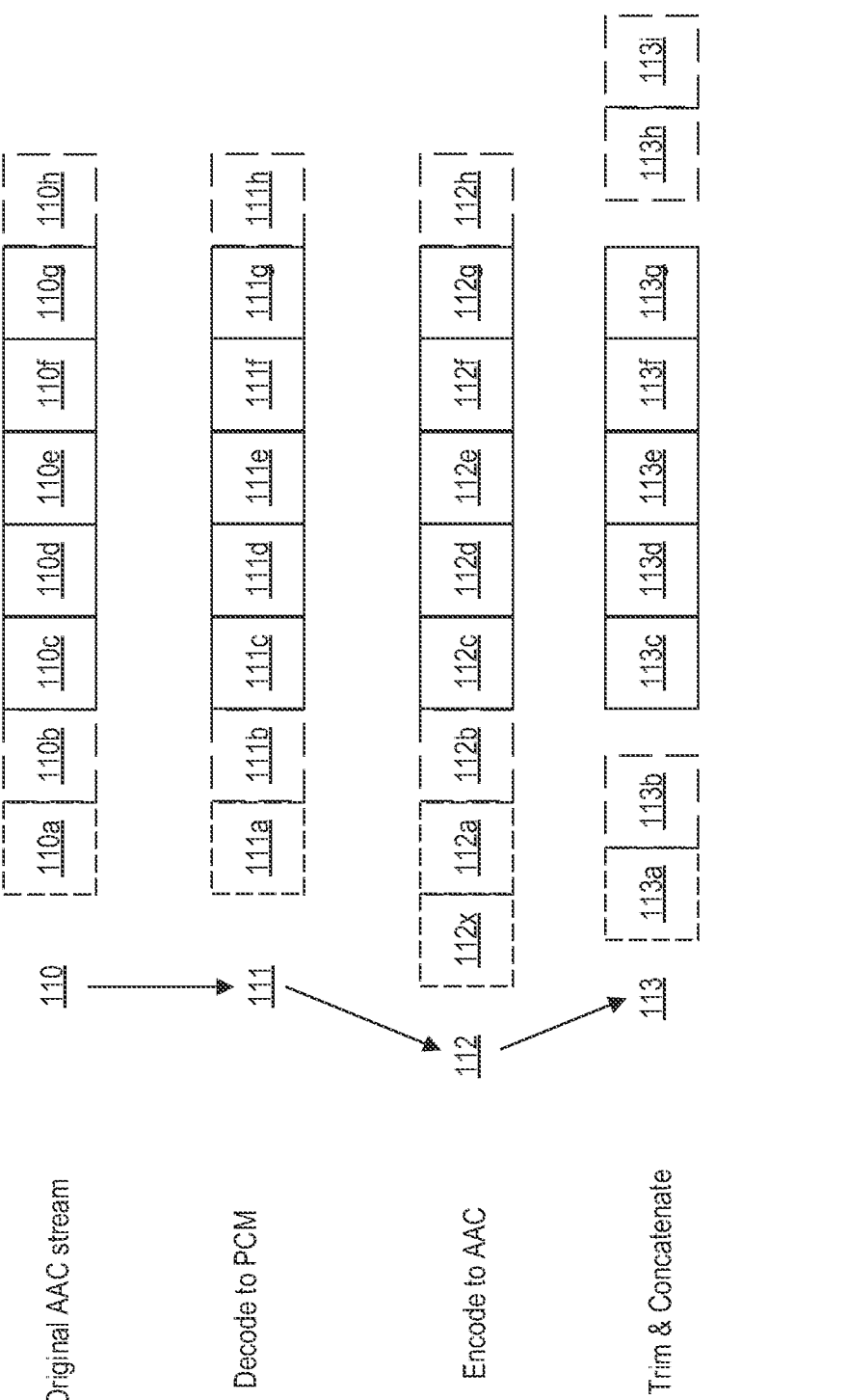
FIG. 2C illustrates a diagram of various aspects of audio data processing implemented by a system for processing audio data utilizing a plurality of distributed computer devices, according to an example.

Reference is now made to FIGS. 2A-2C. FIGS. 2A-2C illustrate various aspects of a system environment, including a system, that may be implemented to process audio data using a plurality of distributed computer devices. In particular, FIG. 2A illustrates a block diagram of a system environment, including a system, to process audio data using a plurality of distributed computer devices, according to an example. FIG. 2B illustrates a block diagram of the system to process audio data using a plurality of distributed computer devices, according to an example. FIG. 2C illustrates a diagram of various aspects of audio data processing implemented by a system for processing audio data utilizing a plurality of distributed computer devices, according to an example.

As will be described in the examples below, one or more of system 100, external system 200, user devices 300A-B and system environment 1000 shown in FIGS. 2A-B may be operated by a service provider to process audio data using a plurality of distributed computer devices. It should be appreciated that one or more of the system 100, the external system 200, the user devices 300A-B and the system environment 1000 depicted in FIGS. 2A-B may be provided as examples. Thus, one or more of the system 100, the external system 200 the user devices 300A-B and the system environment 1000 may or may not include additional features and some of the features described herein may be removed and/or modified without departing from the scopes of the system 100, the external system 200, the user devices 300A-B and the system environment 1000 outlined herein. Moreover, in some examples, the system 100, the external system 200, and/or the user devices 300A-B may be associated with a social networking system, a content sharing network, an advertisement system, an online system, and/or any other system that facilitates any variety of digital content in personal, social, commercial, financial, and/or enterprise environments.

While the servers, systems, subsystems, and/or other computing devices shown in FIGS. 2A-2B may be shown as single components or elements, it should be appreciated that one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 100, the external system 200, the user devices 300A-B or the system environment 1000.

It should also be appreciated that the systems and methods described herein may be particularly suited for digital content, but are also applicable to a host of other distributed content or media. These may include, for example, content or media associated with data management platforms, search or recommendation engines, social media, and/or data communications involving communication of potentially personal, private, or sensitive data or information. These and other benefits will be apparent in the descriptions provided herein.

In some examples, the external system 200 may include any number of servers, hosts, systems, and/or databases that store data to be accessed by the system 100, the user devices 300A-B, and/or other network elements (not shown) in the system environment 1000. In addition, in some examples, the servers, hosts, systems, and/or databases of the external system 200 may include one or more storage mediums storing any data. In some examples, and as will be discussed further below, the external system 200 may be utilized to store any information. As will be discussed further below, in other examples, the external system 200 may be utilized by a service provider (e.g., a social media application provider) as part of a data storage, wherein a service provider may access data on the external system 200 to generate and deliver a content item to one or more user devices.

In some examples, the user devices 300A-B may be electronic or computing devices configured to transmit and/or receive data. In this regard, each of the user devices 300A-B may be any device having computer functionality, such as a television, a radio, a smartphone, a tablet, a laptop, a watch, a desktop, a server, or other computing or entertainment device or appliance. In some examples, the user devices 300A-B may be mobile devices that are communicatively coupled to the network 400 and enabled to interact with various network elements over the network 400. In some examples, the user devices 300A-B may execute an application allowing a user of the user devices 300A-B to interact with various network elements on the network 400. Additionally, the user devices 300A-B may execute a browser or application to enable interaction between the user devices 300A-B and the system 100 via the network 400.

Moreover, in some examples and as will also be discussed further below, the user devices 300A-B may be utilized by a user viewing content (e.g., a live sporting event) distributed by a content platform provider, wherein information relating to the user may be stored and transmitted by the user devices 300A to other devices, such as the external system 200. In some examples, and as will described further below, a user may utilize the user device 300A to receive a content item associated with a content platform. Also, in some examples, by a user utilizing the user device 300B may utilize the user device 300B to provide feedback (e.g., a comment) associated with the content item associated with the content platform as well.

The system environment 1000 may also include the network 400. In operation, one or more of the system 100, the external system 200 and the user devices 300A-B may communicate with one or more of the other devices via the network 400. The network 400 may be a local area network (LAN), a wide area network (WAN), the Internet, a cellular network, a cable network, a satellite network, or other network that facilitates communication between, the system 100, the external system 200, the user devices 300A-B and/or any other system, component, or device connected to the network 400. The network 400 may further include one, or any number, of the exemplary types of networks mentioned above operating as a stand-alone network or in cooperation with each other. For example, the network 400 may utilize one or more protocols of one or more clients or servers to which they are communicatively coupled. The network 400 may facilitate transmission of data according to a transmission protocol of any of the devices and/or systems in the network 400. Although the network 400 is depicted as a single network in the system environment 1000 of FIG. 2A, it should be appreciated that, in some examples, the network 400 may include a plurality of interconnected networks as well.

In some examples, and as will be discussed further below, the system 100 may utilize artificial intelligence (AI) and machine learning (ML) techniques to process audio data using a plurality of distributed computer devices. Details of the system 100 and its operation within the system environment 1000 will be described in more detail below.

As shown in FIGS. 2A-2B, the system 100 may include processor 101 and the memory 102. In some examples, the processor 101 may execute the machine-readable instructions stored in the memory 102. It should be appreciated that the processor 101 may be a semiconductor-based microprocessor, a central processing unit (CPU), an application specific integrated circuit (ASIC), a field-programmable gate array (FPGA), and/or other suitable hardware device.

In some examples, the memory 102 may have stored thereon machine-readable instructions (which may also be termed computer-readable instructions) that the processor 101 may execute. The memory 102 may be an electronic, magnetic, optical, or other physical storage device that contains or stores executable instructions. The memory 102 may be, for example, random access memory (RAM), an Electrically Erasable Programmable Read-Only Memory (EEPROM), a storage device, an optical disc, or the like. The memory 102, which may also be referred to as a computer-readable storage medium, may be a non-transitory machine-readable storage medium, where the term "non-transitory" does not encompass transitory propagating signals. It should be appreciated that the memory 102 depicted in FIGS. 2A-B may be provided as an example. Thus, the memory 102 may or may not include additional features, and some of the features described herein may be removed and/or modified without departing from the scope of the memory 102 outlined herein.

It should be appreciated that, and as described further below, the processing performed via the instructions on the memory 102 may or may not be performed, in part or in total, with the aid of other information and data, such as information and data provided by the external system 200 and/or the user devices 300A-B. Moreover, and as described further below, it should be appreciated that the processing performed via the instructions on the memory 102 may or may not be performed, in part or in total, with the aid of or in addition to processing provided by other devices, including for example, the external system 200 and/or the user devices 300A-B.

In some examples, the memory 102 may store instructions, which when executed by the processor 101, may cause the processor to: receive audio data associated with a content item in an initial format; decode audio data received in an initial format to generate decoded audio data a decoding format; encode decoded audio data in a decoding format to generate encoded audio data in an encoding format; trim a segment of encoded audio data in an encoding format to generate a trimmed segment of audio data; and concatenate a trimmed segment of audio data to a preceding audio segment for playback.

In some examples, and as discussed further below, the instructions 103-107 on the memory 102 may be executed alone or in combination by the processor 101 to process audio data using a plurality of distributed computer devices. In some examples, the instructions 103-107 may be implemented in association with a content platform configured to provide content for users, while in other examples, the instructions 103-107 may be implemented as part of a stand-alone application.

Additionally, and as described above, it should be appreciated that to provide generation and delivery of content, instructions 103-107 may utilize various artificial intelligence (AI) and machine learning (ML) based tools. For instance, these artificial intelligence (AI) and machine learning (ML) based tools may be used to generate models that may include a neural network (e.g., a recurrent neural network (RNN)), generative adversarial network (GAN), a tree-based model, a Bayesian network, a support vector, clustering, a kernel method, a spline, a knowledge graph, or an ensemble of one or more of these and other techniques. It should also be appreciated that the system 100 may provide other types of machine learning (ML) approaches as well, such as reinforcement learning, feature learning, anomaly detection, etc.

In some examples, the instructions 103 may receive audio data associated with a content item in an initial format. In some examples, the content item received by the instructions 103 may be a live-streaming broadcast of a sporting event transmitted by a remote (publication) device. In other examples, the content item received by the instructions 103 may be a video-on-demand (VOD) file that may be pre-recorded (e.g., not real-time).

In some examples, the content item received by the instructions 103 may be transmitted according to one or more publication formats (e.g., initial formats). In some examples, video data associated with the content item received by the instructions 103 may be in Advanced Video Coding (AVC) format. In some examples, audio data associated with the content item received by the instructions 103 may be in an Advanced Audio Coding (AAC) format. FIG. 2C illustrates a portion of an audio stream in an (initial) Advanced Audio Coding (AAC) format 110 (also "the audio stream 110"). In one example, the audio stream 110 may be shown in "mid-stream."

In some examples, the audio stream 110 may include one or more Advanced Audio Coding (AAC) frames 110*a-h*. In some examples, the instructions 103 may determine an audio segment for playback (or "chunk") for processing in a distributed manner. As used herein, an "audio segment for playback" may include one or more audio frames that may be processed for playback (e.g., at a user device). In particular, in some examples and as will be discussed further below, a first audio segment for playback processed at a first device of a plurality of distributed computer devices and a second audio segment for playback processed at a second device of the plurality of distributed computer devices may be transmitted sequentially to a user device for continuous playback.

In some examples, the audio segment for playback may include one or more frames of audio data. That is, in various examples, a length of the audio segment determined via the instructions 103 may include any number of audio frames. In various examples, this may include five (5), seven (7), or ten (10) frames of audio data. In the example illustrated in FIG. 2C, the five (5) Advanced Audio Coding (AAC) frames 110*c-g* may represent an audio segment (or "chunk") for playback.

In some examples, the instructions 104 may decode audio data received in an initial format to generate decoded audio data a decoding format. In some examples, the decoding format may be pulse-code modulation (PCM) format. In particular, in some examples, the instructions 104 may decode audio data received in an Advanced Audio Coding (AAC) format in to pulse-code modulation (PCM) format. As illustrated in FIG. 2C, in some examples, to decode audio data to pulse-code modulation (PCM) format, the instructions 104 may decode the one or more Advanced Audio Coding (AAC) frames 110*a-h* (e.g., received via the instructions 103) into one or more pulse-code modulation (PCM) frames 111*a-h*.

In some examples, to decode audio data to a decoding format (e.g., pulse-code modulation (PCM)), the instructions 104 may decode one or more audio frames to include an audio segment for playback, a preceding data element (e.g., a "prefix data element"), and a following data element (e.g., a "suffix data element"). In some examples and as will be discussed in further detail below, the preceding data element and the following data element may be utilized to enable a distributed cluster of networked computer devices to process (e.g., transcode), assemble, and/or transmit one or more segments of audio data according to a continuous representation of an associated content item.

In some examples, during the decoding to the decoding format (e.g., pulse-code modulation (PCM)), a preceding data element included by the instructions 104 may have one or more frames of audio data. In some examples, the one or more frames of audio data may be preceding frames (e.g., preceding an audio segment for playback) from a content item received in an initial format (e.g., via the instructions 103). In some examples, the preceding data element generated by the instructions 104 may include two or more frames of audio data.

In some examples, during the decoding to the decoding format (e.g., pulse-code modulation (PCM)), a following data element included by the instructions 104 may have one or more frames of audio data. In some examples, the one or more frames of audio data may be following frames (e.g., following an audio segment for playback) from a content item received in an initial format (e.g., via the instructions 103). In some examples, the following data element generated by the instructions 104 may include one or more frames of audio data.

In particular, as discussed above, in some examples, Advanced Audio Coding (AAC) may utilize one or more "frames" of audio data including one thousand twenty-four (1024)) of samples of audio data. Also, in some examples, Advanced Audio Coding (AAC) may implement modified discrete cosine transform (MDCT) that may utilize a "window function" with a "window" of two thousand forty-eight (2048) samples as well. Accordingly, in some examples, given that the modified discrete cosine transform (MDCT) window that used to encode includes two thousand forty-eight (2048) samples, and given that each audio frame includes one thousand twenty-four (1024) samples, it may be appreciated that an audio segment for playback may be prefixed with two preceding audio frames and may be suffixed with one following audio frame. In some examples, this may enable generation of an accurate continuous pulse-code modulation (PCM) representation.

So, in the example illustrated in FIG. 2C, the instructions 104 may decode the received audio data (e.g., in an Advanced Audio Coding (AAC) format) to utilize a decoded segment 111 including a preceding data element and a following data element. As discussed above, in some examples, the audio segment (or "chunk") for playback may include five Advanced Audio Coding (AAC) frames for playback (e.g., 110*c-g*), which may be decoded into pulse-code modulation (PCM) frames 111*c-g*. In addition, in the example shown in FIG. 2C, the (two) preceding audio frames 111*a* and 111*b* (corresponding to the Advanced Audio Coding (AAC) frames 110a and 110b respectively) may be included to generate a decoded segment 111. Furthermore, in the example shown in FIG. 2C, the (one) following audio frame 111h (corresponding to the Advanced Audio Coding (AAC) frame 110h) may be included to generate a decoded segment 111. Accordingly, in the example illustrated in FIG. 2C, the decoded segment 111 may include eight audio frames in total.

In some examples, the instructions 105 may encode decoded audio data in a decoding format to generated encoded audio data in an encoding format. In particular, the decoded audio data may be encoded to generate one or more renditions (as described above) in various encoding settings (also formats). In some examples, the decoding format may be pulse-code modulation (PCM) format (e.g., as provided via the instructions 104), and the encoding format may be Advanced Audio Coding (AAC). So, in the example illustrated in FIG. 2C, the instructions 105 may encode received audio data to generate an encoded segment 112 (e.g., encoded in Advanced Audio Coding (AAC))

Furthermore, in some examples, during encoding to an encoding format (e.g., Advanced Audio Coding (AAC)), the instructions 105 may include a priming data element as well. In particular, in some examples, to enable processing according to certain audio formats (e.g., Advanced Audio Coding (AAC)), the instructions 105 may include the priming data element. In some examples, the priming data element may be one frame of audio data. Also, in some examples, and as discussed above, the priming data element may be discarded at each chunk except a first one in an audio stream. So, in the example illustrated in FIG. 2C, the encoded segment 112 may include a priming data element 112x, which may be discarded.

In some examples, the instructions 106 may trim a segment of encoded audio data in an encoding format to generate a trimmed segment of audio data. In particular, in some examples, the instructions 106 may trim a predetermined number of audio frames (e.g., five (5), seven (7), or ten (10) frames) to generate the one or more audio segments for playback.

So, in the example illustrated in FIG. 2C, the instructions 106 may trim a decoded segment 113, the trimmed portions of the decoded segment 113 including preceding data element 113a and 113b and a following data element 113h, to produce a trimmed segment of audio data 113c-g. In particular, in the example illustrated in FIG. 2C, the trimmed segments of audio data 113c-g may correspond to the Advanced Audio Coding (AAC) frames 112c-g.

It may be appreciated that, in some examples, the preceding data elements 113a and 113b may be transcoded in a previous chunk of audio data (e.g., by a different computing element), and the following data element 113h may be transcoded in a following chunk of audio data (e.g., by a different computing element). In some examples, the following data element 113h may be transcoded in a following chunk of audio data along with a following data element 113i.

In some examples, to transcode a segment of audio data (e.g., according to a particular rendition), the instructions 107 may and concatenate a trimmed segment of audio data to a preceding audio segment to generate a concatenated trimmed segment of audio data and preceding audio segment. Furthermore, in some examples, the instructions 107 may transmit the concatenated preceding audio segment and the trimmed segment of audio data to a user device for (continuous) playback.

So, in some examples, to implement distributed audio processing as described, the (second) trimmed segment of audio data may be processed by a different computing element (e.g., computing device) than the (first) preceding audio segment. That is, in some examples, the instructions 107 may concatenate a trimmed segment of audio data (e.g., the trimmed segment of audio data 113c-g) to a preceding audio segment such that the preceding audio segment and the trimmed segment of audio data may be played continuously and without interruption (e.g., without disruptions or glitches).

Figure 3:
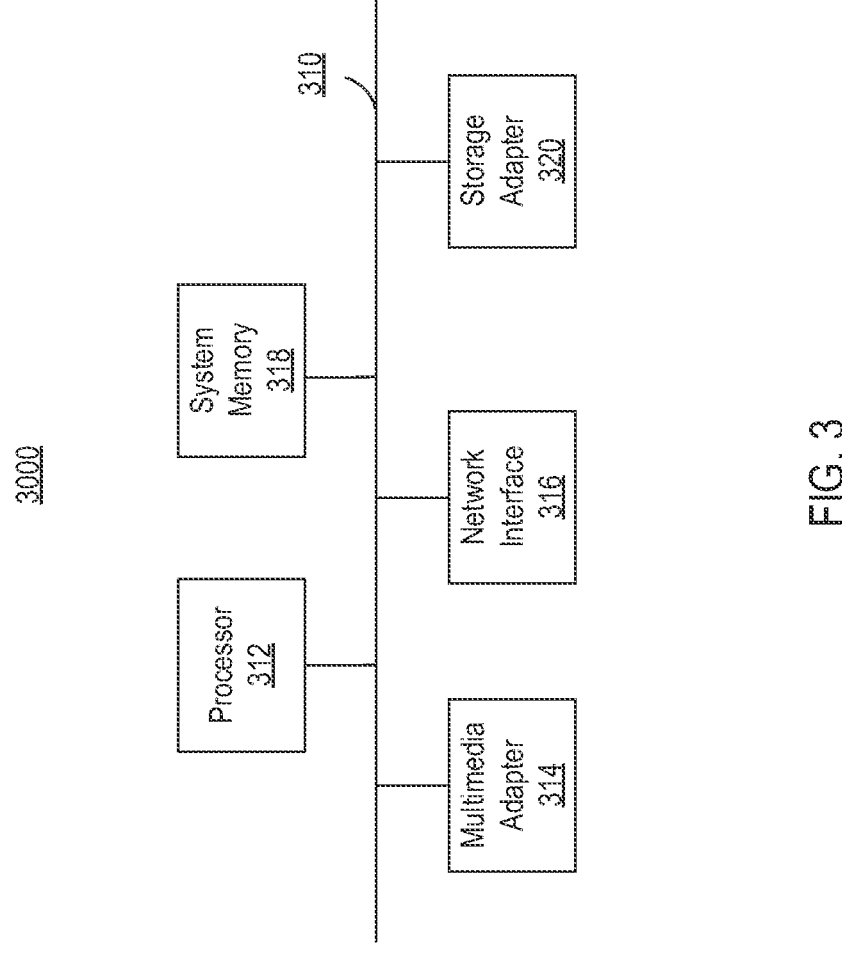
FIG. 3 illustrates a block diagram of a computer system to process audio data using a plurality of distributed computer devices, according to an example.

FIG. 3 illustrates a block diagram of a computer system to process audio data using a plurality of distributed computer devices, according to an example. In some examples, the system 3000 may be associated the system 100 to perform the functions and features described herein. The system 3000 may include, among other things, an interconnect 310, a processor 312, a multimedia adapter 314, a network interface 316, a system memory 318, and a storage adapter 320.

The interconnect 310 may interconnect various subsystems, elements, and/or components of the external system 300. As shown, the interconnect 310 may be an abstraction that may represent any one or more separate physical buses, point-to-point connections, or both, connected by appropriate bridges, adapters, or controllers. In some examples, the interconnect 310 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 310 may allow data communication between the processor 312 and system memory 318, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 312 may be the central processing unit (CPU) of the computing device and may control overall operation of the computing device. In some examples, the processor 312 may accomplish this by executing software or firmware stored in system memory 318 or other data via the storage adapter 320. The processor 312 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 314 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 316 may provide the computing device with an ability to communicate with a variety of remote devices over a network (e.g., network 400 of FIG. 1A) and may include, for example, an Ethernet adapter, a Fibre Channel adapter, and/or other wired- or wirelessenabled adapter. The network interface 316 may provide a direct or indirect connection from one network element to another, and facilitate communication and between various network elements.

The storage adapter 320 may connect to a standard computer-readable medium for storage and/or retrieval of information, such as a fixed disk drive (internal or external).

Many other devices, components, elements, or subsystems (not shown) may be connected in a similar manner to the interconnect 310 or via a network (e.g., network 400 of FIG. 1A). Conversely, all of the devices shown in FIG. 3 need not be present to practice the present disclosure. The devices and subsystems can be interconnected in different ways from that shown in FIG. 3. Code to implement the dynamic approaches for payment gateway selection and payment transaction processing of the present disclosure may be stored in computer-readable storage media such as one or more of system memory 318 or other storage. Code to implement the dynamic approaches for payment gateway selection and payment transaction processing of the present disclosure may also be received via one or more interfaces and stored in memory. The operating system provided on system 100 may be MS-DOS, MS-WINDOWS, OS/2, OS X, 10S, ANDROID, UNIX, Linux, or another operating system.

Figure 4:
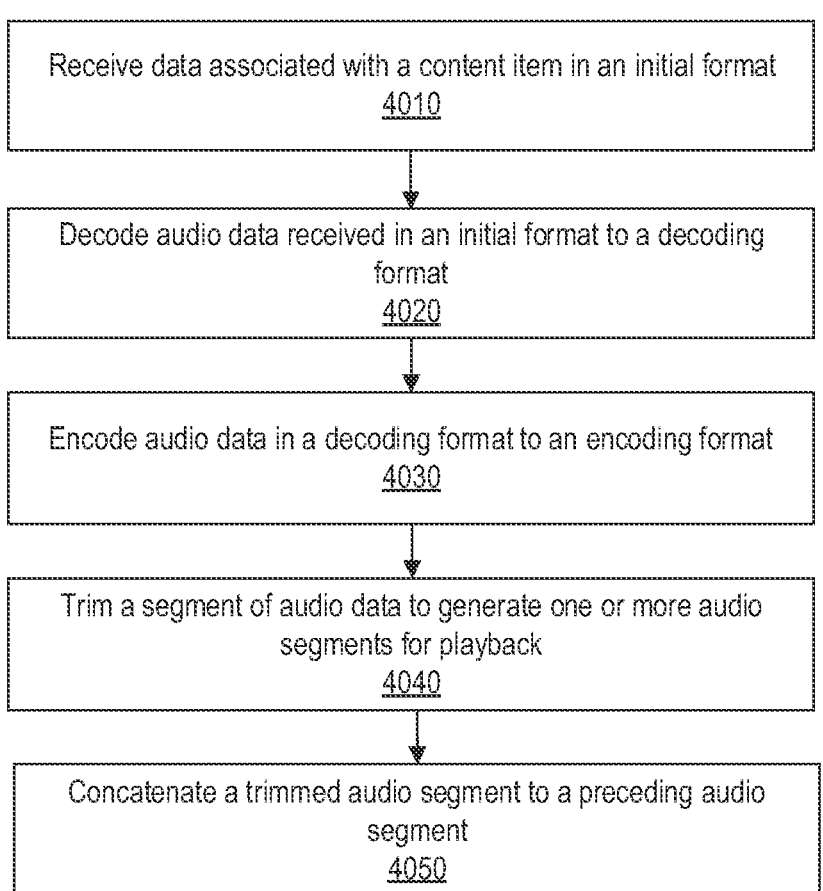
FIG. 4 illustrates a method for processing audio data using a plurality of distributed computer devices, according to an example.

FIG. 4 illustrate a method for process audio data using a plurality of distributed computer devices, according to an example. The method 4000 is provided by way of example, as there may be a variety of ways to carry out the method described herein. Each block shown in FIG. 4 may further represent one or more processes, methods, or subroutines, and one or more of the blocks may include machine-readable instructions stored on a non-transitory computer-readable medium and executed by a processor or other type of processing circuit to perform one or more operations described herein.

Although the method 4000 is primarily described as being performed by system 100 as shown in FIGS. 2A-B, the method 4000 may be executed or otherwise performed by other systems, or a combination of systems. It should be appreciated that, in some examples, to generate audio and video content based on text content, the method 4000 may incorporate artificial intelligence (AI) or deep learning techniques, as described above. It should also be appreciated that, in some examples, the method 4000 may be implemented in conjunction with a content platform (e.g., a social media platform) to generate and deliver content.

Reference is now made with respect to FIG. 4. In some examples, at 4010, the processor 101 may receive data associated with a content item in an initial format. In some examples, audio data associated with the content item received may be in an Advanced Audio Coding (AAC) format.

At 4020, the processor 101 may decode audio data received in an initial format to a decoding format. In some examples, the decoding format may be pulse-code modulation (PCM) format. In some examples, to decode audio data to a decoding format (e.g., pulse-code modulation (PCM)), the processor 101 may decode one or more audio frames to include audio segment (or "chunk") for playback, a preceding data element (e.g., a "prefix data element"), and a following data element (e.g., a "suffix data element"). In some examples, the audio segment for playback may include five Advanced Audio Coding (AAC) frames for playback (e.g., 110c-g). Also, in some examples, the preceding data element generated by the processor 101 may include two or more frames of audio data, and the following data element generated by the processor 101 may include one or more frames of audio data.

At 4030, the processor 101 may encode audio data in a decoding format to an encoding format. In some examples, the processor 101 may encode the audio data to include an audio segment for playback, a preceding data element, and a following data element. Furthermore, in some examples, the processor 101 may generate a priming data element as well. In some examples, the processor 101 may encode the audio data to a plurality of encoding formats to generate a plurality of renditions.

At 4040, the processor 101 may trim a segment of audio data to generate one or more audio segments for playback. In particular, in some examples, the processor 101 may trim a predetermined number of audio frames (e.g., five (5) frames) to generate the one or more audio segments for playback.

At 4050, the processor 101 may concatenate a trimmed segment of audio data to a preceding audio segment. In some examples, the processor 101 may concatenate the trimmed segment of audio data to a preceding audio segment such that the preceding audio segment and the trimmed segment of audio data may be played continuously and without interruption (e.g., without disruptions or glitches). Also, in some examples, the processor 101 may transmit the preceding audio segment and the trimmed segment of audio data to a user device for playback.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A system for implementing audio transcoding in a distributed fashion, comprising:

a first computer system comprising one or more processors and memory storing instructions, which when executed by the one or more processors, cause the one or more processors to:

receive audio data associated with a content item in an initial format;

decode the audio data associated with the content item in the initial format to generate decoded audio data in a decoding format;

encode the decoded audio data in the decoding format to encoded audio data in an encoding format; and trim, by a first computer system, a segment of the encoded audio data in the encoding format to generate a trimmed segment of audio data; and a second computer system discrete relative to the first computer system, the second computer system configured to:

determine a preceding audio segment while the first computer system trims the segment;

receive the trimmed segment from the first computer system;

concatenate the trimmed segment of audio data with a preceding audio segment to generate a concatenated trimmed segment of audio data and preceding audio segment; and transmit the concatenated trimmed segment of audio data and preceding audio segment to a user device for playback.

2. The system of claim 1, wherein the initial format is a publication format utilized by a remote device, and the publication format is Advanced Audio Coding (AAC).

3. The system of claim 1, wherein to receive the audio data associated with the content item in the initial format, the instructions when executed by the one or more processors further cause the one or more processors to determine a length of an audio segment for processing.

4. The system of claim 1, wherein the decoding format is pulse-code modulation (PCM).

5. The system of claim 1, wherein the decoded audio data in the decoding format comprises an audio segment for playback, a preceding data element, and a following data element.

6. The system of claim 5, wherein the audio segment for playback comprises five (5) frames of audio data.

7. A method for processing of audio data using a plurality of distributed computer devices, comprising:

receiving audio data associated with a content item in an initial format;

decoding the audio data associated with the content item in the initial format to generate decoded audio data in a decoding format;

encoding the decoded audio data in the decoding format to encoded audio data in an encoding format;

trimming, by a first computer system, a segment of the encoded audio data in the encoding format to generate a trimmed segment of audio data;

determining, by a second computer system discrete relative to the first computer system, a preceding audio segment while the first computer system trims the segment;

concatenating, by the second computer system, the trimmed segment of audio data with a preceding audio segment to generate a concatenated trimmed segment of audio data and preceding audio segment; and transmitting the concatenated trimmed segment of audio data and preceding audio segment to a user device for playback.

8. The method of claim 7, wherein receiving the audio data associated with the content item in the initial format comprises determining an audio segment for playback.

9. The method of claim 7, wherein the decoded audio data in the decoding format comprises an audio segment for playback, a preceding data element, and a following data element.

10. The method of claim 9, wherein the audio segment for playback comprises five (5) frames of audio data.

11. The method of claim 9, wherein the preceding data element comprises two (2) frames of audio data.

12. The method of claim 9, wherein the following data element comprises one (1) frame of audio data.

13. A non-transitory computer-readable storage medium for implementing audio transcoding in a distributed fashion and having an executable stored thereon, wherein the executable when executed instructs a processor to:

receive audio data associated with a content item in an initial format;

decode the audio data associated with the content item in the initial format to generate decoded audio data in a decoding format;

encode the decoded audio data in the decoding format to encoded audio data in an encoding format;

trim, by a first computer system, a segment of the encoded audio data in the encoding format to generate a trimmed segment of audio data;

determine, by a second computer system discrete relative to the first computer system, a preceding audio segment while the first computer system trims the segment;

concatenate, by the second computer system, the trimmed segment of audio data with a preceding audio segment to generate a concatenated trimmed segment of audio data and preceding audio segment; and transmit the concatenated trimmed segment of audio data and preceding audio segment to a user device for playback.

14. The non-transitory computer readable storage medium of claim 13, wherein the initial format is a publication format utilized by a remote device, and the publication format is Advanced Audio Coding (AAC).

15. The non-transitory computer-readable storage medium of claim 13, wherein the decoding format is pulse-code modulation (PCM).

16. The non-transitory computer-readable storage medium of claim 13, wherein the encoded audio data in the encoding format comprises an audio segment for playback, a preceding data element, and a following data element.

17. The non-transitory computer-readable storage medium of claim 13, wherein the encoded audio data in the encoding format further comprises a priming data element.

* * * * *